United States Patent [19]
Becker
[11] 3,805,950
[45] Apr. 23, 1974

[54] APPARATUS FOR CONTROLLING THE PATH OF MOVEMENT OF A MOVABLE CONVEYOR

[75] Inventor: Rolf Becker, Michelstadt, Odenwald, Germany
[73] Assignee: Bruckner-Engineering GmbH, Leonberg, Germany

[22] Filed: Apr. 15, 1971
[21] Appl. No.: 134,277

[30] Foreign Application Priority Data
Apr. 17, 1970 Germany .......... 2018608

[52] U.S. Cl. .......... 198/202, 226/23
[51] Int. Cl. .......... B65g 15/62, B65h 25/26
[58] Field of Search .......... 198/184, 202; 226/23; 74/241, 242.1 TA

[56] References Cited
UNITED STATES PATENTS

| 2,877,013 | 3/1959 | Wendshuh | 226/23 |
|---|---|---|---|
| 2,511,194 | 6/1950 | Blaber | 198/202 |

*Primary Examiner*—Edward A. Sroka
*Attorney, Agent, or Firm*—Learman & McCulloch

[57] ABSTRACT

Apparatus for controlling the path of movement of the movable conveyor comprises a control arm mounted for pendular movement about an axis lying in a vertical plane with one edge of the conveyor when the latter occupies a preferred path, the arm having rollers in engagement with the one edge of the conveyor so that the control arm may swing about its axis in response to shifting of the conveyor laterally in either direction from the preferred path. A pivoted control roller acts on the conveyor and influences its path and is operable in response to pivotal movement to shift the conveyor laterally of its path of movement. Motion transmitting means interconnects the control arm and the control roller and is operable in response to swinging movement of the control arm in one direction to rock the control roller in such direction as to shift the conveyor in a direction opposite that in which it swings the control arm, thereby maintaining the conveyor on the preferred path.

9 Claims, 6 Drawing Figures

W
A
21
12
6
1
1a
20
19
8
E
23
9
10
13

Fig. 1
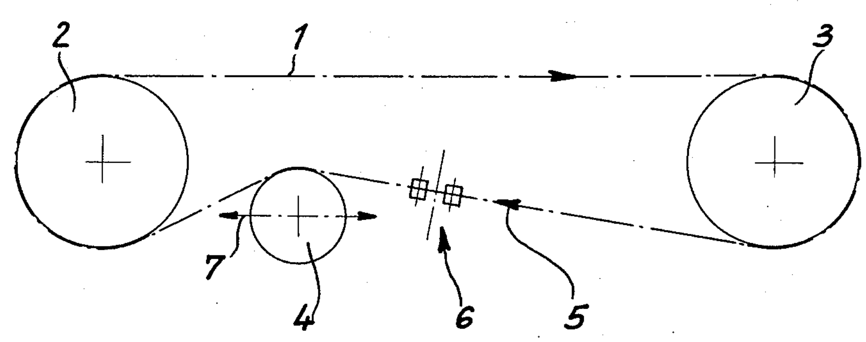
Fig. 4
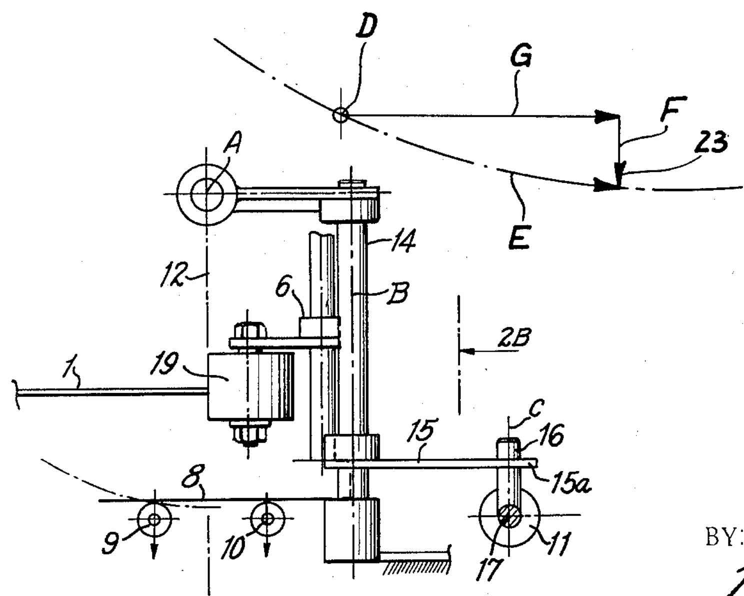
Fig. 2A
INVENTOR:
Rolf Becker
BY:
Leaman & McCulloch

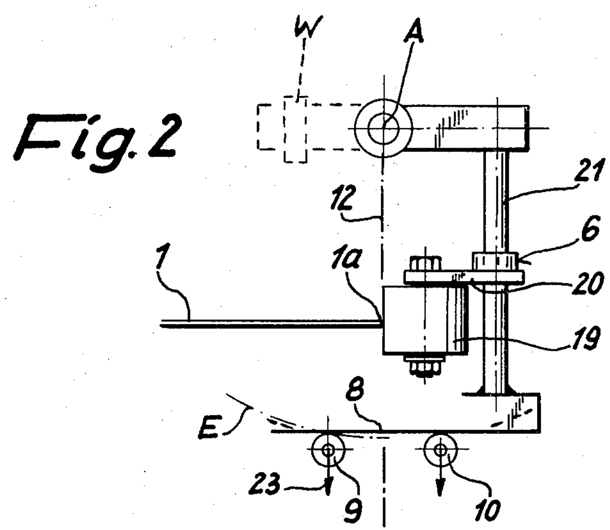
Fig. 2
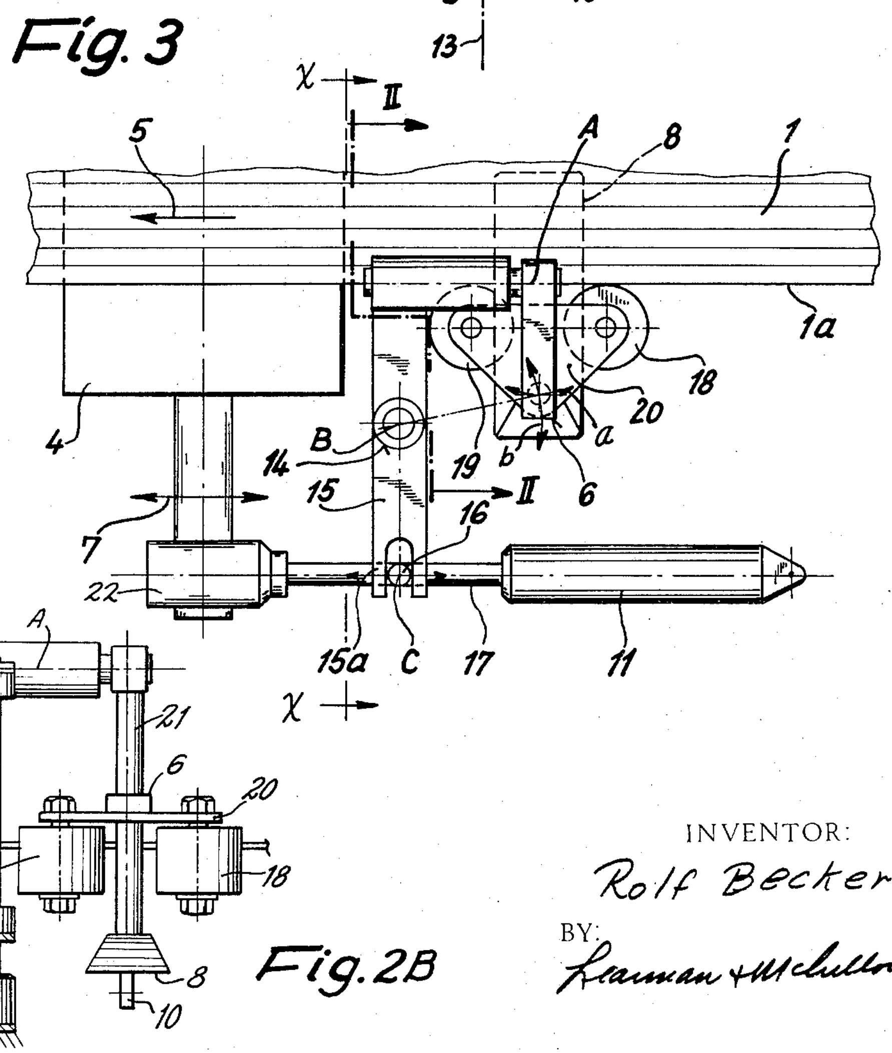
Fig. 3
Fig. 2B
INVENTOR:
Rolf Becker
BY:
Leaman & McCulloch

APPARATUS FOR CONTROLLING THE PATH OF MOVEMENT OF A MOVABLE CONVEYOR

The invention disclosed herein relates to apparatus for controlling the position or path of a movable conveyor, such as an endless belt.

In the use of conveyor belts it is common for the belt to shift transversely of its direction of conveying movement. It is desirable to prevent such transverse movement or, if it occurs, to return the belt to its preferred path. Heretofore, electric feelers have been utilized for this purpose, the feelers actuating magnetic or other control devices for exerting the desired forces on a conveyor to maintain it on a proper path. The prior devices, however, are disadvantageous in that they are unable to discriminate between large and small deviations of the conveyor path. Other known controlled devices have included pneumatic bounce or deflecting plate-valve arrangements, but they represent an undesirably high cost.

The principal object of this invention is to provide apparatus for controlling the path of a movable conveyor, the apparatus being of simple design, but nevertheless enabling both small and large deviations of the conveyor path to be detected and corrected.

The foregoing object is accomplished according to the invention by providing a control device having a pendulum arm which carries means in engagement with one edge of the conveyor whereby the arm will swing in accordance with transverse deviations in the conveyor path. The pendulum arm also carries a valve actuator which actuates valves in response to swinging movement of the arm, the valves controlling the flow of pressure fluid to a hydraulic or pneumatic ram which in turn is connected to a pivoted control roller over which the conveyor travels. The position of the pivoted roller determines its angle of attack with the conveyor and thus determines the path of movement of the conveyor. The valve actuator preferably has a configuration such that it executes a pendular movement in response to swinging movement of the pendular arm. The valve actuator is so shaped, however, that the surface thereof which contacts the valves has an elongate surface so that its movement in response to swinging movement of the pendulum arm describes a path which has both a horizontal component and a vertical component. The vertical component is utilized for the actuation of the valves so as to permit more or less adjustment of the fluid pressure ram. Accordingly, the control device enables an extremely precise control to be exerted on the conveyor control roller so as to respond in direct proportion to both small and large deviations of the conveyor track.

The fluid pressure ram preferably is pneumatic, thereby making it possible to utilize the control device without danger in installations which would be menaced by the possibility of explosions in the event electrical control devices were utilized.

To assure positive operation of the control device regardless of the direction in which a conveyor may deviate from its preferred path, it is advantageous to utilze two pneumatic control valves and a double-acting ram so that movement of the piston within the cylinder is positive in both directions. A very smoothly running operation of the control device thus is possible, it being understood that the double-acting ram functions according to the ventilating principle.

It is advantageous if the ends of the valve actuating member are curved on substantially the same radius as the pendulum arm. The actuating element thus is able to partake of extremely large pendular movements without exerting excessively high pressures against the control valves or effecting excessive shifting of the control roller.

To avoid an over-control during the adjustment of the path of the conveyor, it is advantageous if the pendulum arm is connected with the piston rod of the cylinder in the sense of return.

To adapt easily the control device to various kinds of conveyors, such as wire mesh or textile bands, it is desirable for the valve actuating member or the pendulum arm to be provided with variable counterbalancing weights so as to effect adjustment of the pressure with which the control device bears against the conveyor. The center of gravity of the pendulum arm thus always can be changed according to the desired pressure to be applied on the edge of the conveyor.

These and further details of the invention appear from the description of a preferred embodiment illustrated in the drawings, in which:

FIG. 1 is a schematic view of an endless conveyor belt and a control device according to the invention;

FIG. 2 is a lateral view along the line II—II of FIG. 3 of a control device formed according to the invention;

FIG. 2A is a sectional view taken along the line X—X of FIG. 3;

FIGS. 2B is an elevational view taken in the direction of the arrow 2B of FIG. 2A;

FIG. 3 is a top view of the control device; and

FIG. 4 is an illustration of the components of the conveyor.

A typical conveyor is illustrated in FIG. 1 as comprising an endless belt 1, having an upper run of which forms the movable conveyor. The belt 1 is reversed by two reversing rollers 2 and 3. The lower or unloaded run of the belt is conducted over a pivoted control roller 4 which stretches the belt in the direction of the arrow 5. In the area of the control roller 4 is a control device 6 adjacent the edge of the conveyor belt. As will be explained in more detail in the following description of FIGS. 2 – 4, the control device has an actuator plate or element which actuates a valve in case of a change of the edge position of the conveyor belt so as to pivot the control roller 4 in either of two directions indicated by the arrow 7 in such manner that the path of the conveyor around the rollers 2 and 3 is influenced.

As is best illustrated in FIGS. 2 and 2A, the control device 6 is formed as a pendulum having an arm 21 which is pivotally supported for rocking movement about an axis A. Carried by the pendulum arm at its lower end is an elongate valve actuating plate 8 which may have a flat surface, as shown, but preferably has its ends upturned, as indicated in dotted lines, on the arc of a circle having its center at the axis A. The lower surface of the plate 8 cooperates with two pneumatic control valves 9 and 10 of which only the rollers are illustrated for the sake of simplicity. The valves 9 and 10 are oppositely actuated by the plate 8 and are connected, for example, by suitable conduits (not shown) to a cylinder 11 of a double-acting extensible and retractable ram working according to the ventilating principle.

The axis of the pendulum A lies above the level of the conveyor belt. In the neutral position of the belt, that is, when it occupies the preferred path of its travel, its edge 1*a* lies in a vertical plane 12 normal to the axis of the pendulum arm. The vertical plane 12 coincides with a vertical plane 13 which lies equidistant from the valves 9 and 10 so that, when the plate 8 is in its neutral position, neither valve is actuated.

The distance from the plate 8 to the axis A of the pendulum is greater than is the distance from the belt 1 to the axis A, whereby the plate 8 has a correspondingly longer lever arm. If the plate 8 is flat, the effective length of its lever arm increases whenever the pendulum swings so as to depress and thereby actuate one or the other of the valves 9 and 10. In order that the control valves be not depressed more than is necessary in the event of especially large deflections of the pendulum, it is preferred to bend the ends of the actuating plate 8 upwardly along arcs having their centers at the axis A.

Motion transmitting means interconnects the control device 6 and the pivotal roller 4 and comprises a pivot stand having an upstanding shaft 14 which is rotatable about a pivotal axis B. At the upper end of the shaft 14 is journaled the pendulum arm 21 for rocking movement about the axis A. A rocker arm 15 is fixed to the shaft 14 movement about the axis B and has one end 15*a* slotted as at 16 to receive a pin C carried by the piston rod 17 of the ram. By this connection of the shaft 14 with the piston rod 17, the pendulum is connected with the piston rod 17 in the sense of return.

The control device 6 includes two rollers 18 and 19 located one behind the other in the direction of movement of the conveyor belt, the direction of movement being indicated by the arrow 5. Both rollers lie adjacent to and contact the edge 1*a* of the conveyor belt. The rollers 18 and 19 are rotatably mounted on a common yoke 20 which is pivotally supported on the pendulum arm 21 for rocking movement about the axis of the latter in the directions of the arrows *a* and for swinging movement about the axis B in the directions of the arrows *b*.

In the neutral position or preferred path of the conveyor, the rollers 18 and 19 engage the edge 1*a* and locate the pendulum 21 in a substantially vertical plane. Due to the distance of the arm 21 from the plane 12, however, the center of gravity of the device 6 is such that the latter tends to rock clockwise about the axis A, as viewed in FIG. 2, so as to cause the rollers 18 and 19 to bear with some force against the edge 1*a* of the conveyor belt. To enable the force with which the rollers bear against the conveyor belt to be adjusted, the device 6 can include an adjustable counter weight W extending on the opposite side of the axis A, the counter weight being shown in dotted lines in FIG. 2.

As has been pointed out, the double-acting ram is controlled by the valves 9 and 10. The cylinder 11 of the ram is connected by the piston rod 17 with the support 22 of the control roller 4. The roller 4 is mounted for pivotal movement in either of the directions indicated by the double arrows 7 so as to shift its angle of attack with the conveyor belt.

A point of attack D of the valve actuating plate A to a valve roller, e.g., the roller 9, is illustrated in FIG. 4. In order to actuate the valve 9, it must be pressed vertically downwardly in the direction of the arrow 23. Due to the arrangement of the valve plate 8 with respect to the axis A, the control plate partakes of an arcuate movement in response to swinging of the pendulum and point of attack D also follows an arcuate path E. The path E has a vertical component F and a horizontal component G which is transverse to the direction of movement of the valve 9. The sizes of the components G and F can be influenced by two factors, one of which is the shape and length of the plate 8 and the other of which is the distance of the plate 8 from the axis A.

When the apparatus is conditioned for operation, and if, for example, the conveyor belt edge 1*a* moves to the left from the position shown in FIG. 2, the control device 6 will pivot clockwise about the axis A of the pendulum. The control valve 10 will be depressed or actuated by the actuating plate 8 whereby the piston rod 17 will be retracted into the cylinder 11 of the ram and the arm 15 of the pivot stand shaft 14 will be rocked counterclockwise from the position shown in FIG. 3. As the arm 15 rocks counterclockwise, the axis A also will swing counterclockwise about the axis B and the rollers 18 and 19 will be urged toward the edge 1*a* of the conveyor, with the result that the pendulum 21 will be swung counterclockwise, as viewed in FIG. 2, thereby deactuating the valve 10 and stopping movement of the piston rod 17. In this manner over-control is prevented. As the piston rod 17 is retracted, the roller 4 will be rocked counterclockwise from the positions shown in FIG. 3 so as to change its angle of attack with respect to the conveyor belt 1 and thereby cause the latter to return to its original position. As the belt returns to its original position it will engage the rollers 18 and 19 and swing the pendulum counterclockwise, as viewed in FIG. 2, so as to actuate the valve 9 and effect extension of the piston rod 17 from the cylinder 11 of the ram. Such movement of the piston rod will rock the control roller 4 clockwise, as viewed in FIG. 3, so as to discontinue the corrective shifting of the belt 1.

The arrangement is such that the double-acting ram, working according to the ventilating system, functions as a fine sensor of deviation of the conveyor and reacts rapidly to correct the deviation thereof. Since the apparatus operates by fluid pressure, the device can be utilized in explosive environments without risk of explosions.

Variations from the disclosed embodiments are possible. For example, many of the parts can be made of plastic materials having a low specific weight so that the force of application of the contacting rollers thus can be correspondingly decreased.

What is claimed is:

1. Apparatus for controlling the path of movement of a movable conveyor comprising a control device mounted for pendular movement about an axis and having means in engagement with one edge of said conveyor whereby said control device may swing about said axis in response to shifting of said conveyor laterally of its path of movement; a movable control member in engagement with said conveyor operable in response to movement to shift said conveyor laterally of its path of movement; motion transmitting means interconnecting said control member and said control device, said motion transmitting means including a rocker arm connected to said control device for rocking in a plane substantially normal to that of swinging movement of said control device; and actuating means acting on said motion transmitting means and operable in response to swinging movement of said control device in one direction to move said control member in a direction to shift said conveyor laterally of said path in such direction as to permit swinging of said control device in the opposite direction.

2. The apparatus set forth in claim 1 wherein said motion transmitting means includes an extensible and retractable fluid pressure ram and actuating means for extending and retracting said ram.

3. The apparatus set forth in claim 2 wherein said actuating means comprises fluid flow control valves and valve operating means carried by said control device.

4. The apparatus set forth in claim 3 wherein said valve operating means comprises a plate swingable about said axis.

5. The apparatus set forth in claim 4 wherein the distance from said plate to said axis is greater than the distance of said conveyor from said axis.

6. The apparatus set forth in claim 4 wherein the ends of said plate are bent arcuately about a center substantially coinciding with said axis.

7. The apparatus set forth in claim 1 wherein said axis and said one edge of said conveyor lie in a substantially vertical plane when said conveyor occupies the preferred path.

8. The apparatus set forth in claim 1 including adjustable counterbalance means carried by said control device.

9. Apparatus for controlling the path of movement of a movable conveyor comprising a control device mounted for swinging pendular movement about an axis; means carried by said control device in engagement with one edge of said conveyor whereby said control device may swing about said axis in response to shifting of said conveyor laterally of its path of movement; a movable control member in engagement with said conveyor and operable in response to movement to shift said conveyor laterally of its path of movement; pressure fluid motion transmitting means interconnecting said control member and said control device for moving said control member in response to movement of said control device; operating means supported on said control device for swinging movement therewith; and fluid flow valve means for controlling operation of said motion transmitting means and engageable by said operating means in response to swinging movement of said control device in one direction to effect movement of said motion transmitting means and move said control member in a direction to shift said conveyor laterally of said path in such direction as to permit swinging of said control device and said operating member in the opposite direction.

* * * * *